US009483574B2

(12) United States Patent
Decker et al.

(10) Patent No.: US 9,483,574 B2
(45) Date of Patent: Nov. 1, 2016

(54) MANAGING DISTINCT CONTENT LISTS USING USER INTERFACE ELEMENT AND WITHOUT USING MODAL DIALOG BOX

(71) Applicant: Apple Inc., Cupertino, CA (US)

(72) Inventors: Kevin W. Decker, Los Altos, CA (US); Darin Benjamin Adler, Los Gatos, CA (US); Steven J. Falkenburg, Los Altos, CA (US); Raymond Sepulveda, Campbell, CA (US); Craig Federighi, Los Altos Hills, CA (US); Steve O. Lemay, Palo Alto, CA (US); Patrick Coffman, Menlo Park, CA (US); Andreas Wendker, Woodside, CA (US); Brian Croll, Los Altos, CA (US); Chan Karunamuni, San Jose, CA (US); Conrad Shultz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 14/298,324

(22) Filed: Jun. 6, 2014

(65) Prior Publication Data

US 2014/0365855 A1 Dec. 11, 2014

Related U.S. Application Data

(60) Provisional application No. 61/832,946, filed on Jun. 9, 2013.

(51) Int. Cl.
| | | |
|---|---|---|
| *H04L 29/08* | (2006.01) | |
| *H04L 29/12* | (2006.01) | |
| *G06F 17/30* | (2006.01) | |
| *G06F 17/22* | (2006.01) | |

(52) U.S. Cl.
CPC ..... *G06F 17/30899* (2013.01); *G06F 17/2247* (2013.01); *G06F 17/30876* (2013.01); *G06F 17/30884* (2013.01)

(58) Field of Classification Search
CPC ............... G06F 17/24; G06F 17/3089; G06F 17/2247; G06F 17/30899; G06F 17/30876; G06F 17/308884
USPC ........................................................ 715/205
See application file for complete search history.

(56) References Cited

U.S. PATENT DOCUMENTS

| | | | | |
|---|---|---|---|---|
| 5,963,964 A | * | 10/1999 | Nielsen ............. | G06F 17/30884 707/E17.013 |
| 8,181,116 B1 | | 5/2012 | Amacker et al. | |
| 8,386,337 B2 | | 2/2013 | Siegel | |
| 8,555,155 B2 | | 10/2013 | Harrison et al. | |
| 9,035,949 B1 | * | 5/2015 | Oberheu ............... | G06T 11/206 345/440 |
| 2001/0042087 A1 | * | 11/2001 | Kephart ........... | G06F 17/30707 715/229 |
| 2008/0168340 A1 | * | 7/2008 | Jang .................. | G06F 17/30126 715/206 |
| 2012/0311491 A1 | | 12/2012 | Melton et al. | |
| 2013/0151998 A1 | * | 6/2013 | Ookuma ................ | G06F 21/31 715/760 |

FOREIGN PATENT DOCUMENTS

WO   WO 2007/121305 A2   10/2007

\* cited by examiner

*Primary Examiner* — Cesar Paula
*Assistant Examiner* — Luu-Phuong Nguyen
(74) *Attorney, Agent, or Firm* — Fenwick & West LLP

(57) ABSTRACT

A content application includes one or more content list panels. The content application provides mechanisms that allow the user to easily manage article representations included in the content lists such as adding article representations a content list and editing the items directly in menus associated with the content lists.

20 Claims, 15 Drawing Sheets

FIG. 5

MANAGING DISTINCT CONTENT LISTS USING USER INTERFACE ELEMENT AND WITHOUT USING MODAL DIALOG BOX

CROSS-REFERENCE TO RELATED APPLICATIONS

This application claims the benefit of U.S. Provisional Application No. 61/832,946 filed on Jun. 9, 2013, which is incorporated by reference in its entirety.

BACKGROUND

1. Field of Technology

The embodiments generally relate to an application that displays web content. More particularly, the embodiments relate to managing content lists of a content application.

2. Background

Web browser applications typically allow a user to store lists of frequently accessed content for later retrieval. However, management of items in a content list of traditional web browser applications is tedious and lacks smooth and user friendly experiences. Generally, to edit an item in a content list such as bookmark list, the user must first select the item, for example from a sidebar list or in a toolbar, which causes the web browser application to display a modal dialog box that contains one or more properties of the item, such as its name, URL, etc. The user can only edit the properties of the item from within a modal dialog. A modal dialog box is one example of an intermediate user interface element that is used to enter and confirm an edit of a property of an item from a content list. Thus, if the user wants to keep the edit, the user must make a further input to save the edited item from the modal dialog box. Otherwise, the user must cancel the modal dialog box in order to return to the web browser application.

SUMMARY

In one embodiment, a content application is configured to enable direct editing of items one or more content lists, such as a reading list and a bookmarks list, by directly editing the items as they appear in menus or toolbars, without the using a modal dialog box to access the properties of the item. Each content list optionally includes one or more article representations of articles such as web pages which a user has added to the content list for future viewing.

The content application provides mechanisms that allow the user to easily manage article representations included in the content lists. For example, the content application provides a mechanism that allows the user to add an article representation of an article (e.g., a web page), to a content list through a single selection of a user interface element (e.g., a button) of the content application without requiring the use of a modal dialog box to add the article representation to the content list. Furthermore, the content application allows the user to manage content lists which includes editing the title or ordering of menu items included in a menu associated with a content list without requiring the use of a modal dialog box, and creating folders of menu items included in the menu. The lack of modal dialog boxes in the content application allows for an improved user experience when managing content lists because the user does not have to interact with a modal dialog box to manage a content list thereby eliminating an intermediary step.

In one embodiment, to edit a content item appearing in a toolbar of the web browser application, the web application receives a user's selection of the item as it appears in the tool bar or menu, where the selection is provided by a single action, such as a single context-type click. Responsive to the selection, the web browser application places the item in an edit mode within the context of the menu or toolbar, such that the user can directly input edits to the name of the content item. The web browser application then receives these edits. In response to the user entering the edits, such as by clicking elsewhere in the web browser application, or input a keyboard return, the edit is saved.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 4 and 5 are examples of graphical user interfaces of the content viewing application for adding an article to a bookmarks list panel according to one embodiment.

Figure 1:
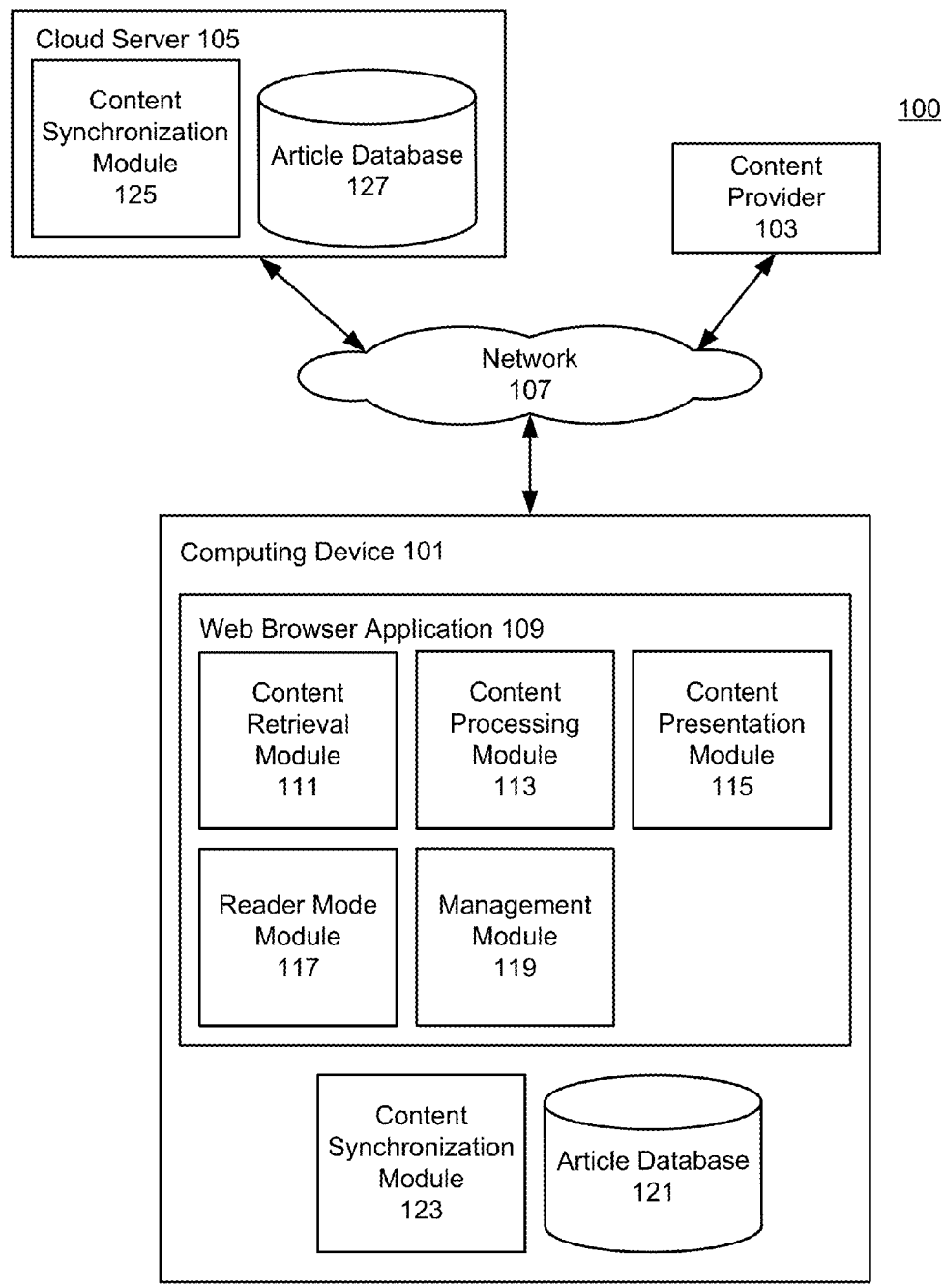
FIG. 1 is a high-level block diagram of a computing environment of a content viewing application according to one embodiment.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

According to one embodiment, a graphical user interface (GUI) is provided to manage articles that can be presented in a content viewing application. In particular, one or more content list panels are implemented as part of a content viewing application such as a web browser application. Throughout the description, a web browser application is utilized as an example of a content viewing application. However, other types of content viewing applications can also be applied to the embodiments disclosed herein.

In one embodiment, a content list panel includes a list of article representations that represent one or more articles (e.g., a web page, audio file, video file, image file, etc.) that can be presented to a user in the web browser application. An example of a content list panel is a bookmark list panel that is configured to list one or more article representations (i.e., bookmarks) of articles that are saved for later retrieval by the user. Another example of a content list panel is a reading list panel that is configured to list one or more article representations of articles that can be presented or read in a reader mode. In one embodiment, the reader mode refers to a display mode of the web browser application in which a web page is displayed in a manner without other unrelated information, such as, the background color or image, or advertisements that are typically displayed with the web page. Further detailed information concerning operations of a reader mode are described by U.S. patent application Ser. No. 12/794,674, entitled "Reader Mode Presentation of Web Content," filed Jun. 4, 2010, which is incorporated by reference herein in its entirety.

Throughout the embodiments disclosed herein, the terms "article" and "article representation" are interchangeable terms dependent upon the associated content being described. When an article is described or displayed within a content list panel, it refers to an article representation that represents the actual article. When an article is described or displayed within a menu of the web browser application, it refers to an article menu item that represents the actual article. When an article is described or displayed within a main window of the web browser application, it refers the actual rendering of the content to the article.

In the embodiments disclosed herein, mechanisms are provided that allow the user to manage content lists of the web browser application. Management of the content lists includes adding an article representation of an article to a content list such as the reading list or bookmarks list, for example. Management of the content lists also includes editing an article menu item in a bookmarks list menu, reordering menu items in the bookmarks list menu, and creating folders of menu items in the bookmarks list menu as will be further described below.

System Environment

FIG. 1 is a high-level block diagram of a computing environment 100 for managing articles in a web browser application according to one embodiment. The environment 100 includes a computing device 101 communicatively coupled to a content provider 103 and a cloud server 105 via a network 107. The network 107 optionally comprises any combination of local area and/or wide area networks, using both wired and wireless communication systems.

In one embodiment, the content provider 103 provides articles such as web pages to the computing device 101. A web site is an example of a content provider 103. Although only a single content provider 103 is shown in FIG. 1, multiple content providers are in communication with the computing device 101.

In one embodiment, the computing device 101 is an electronic device such as a desktop computer (e.g., an iMac™), a laptop computer (e.g., MacBook™), a tablet computer (e.g., iPad™), a mobile phone (e.g., iPhone™), a media device (e.g., iPod™), etc. Generally, the computing device 101 allows a user to view articles provided by the content provider 103 via the computing device 101. In particular, the computing device 101 is optionally used by a user to view articles represented in one or more content list panels of a web browser application 109 of the computing device 101.

Figure 2:
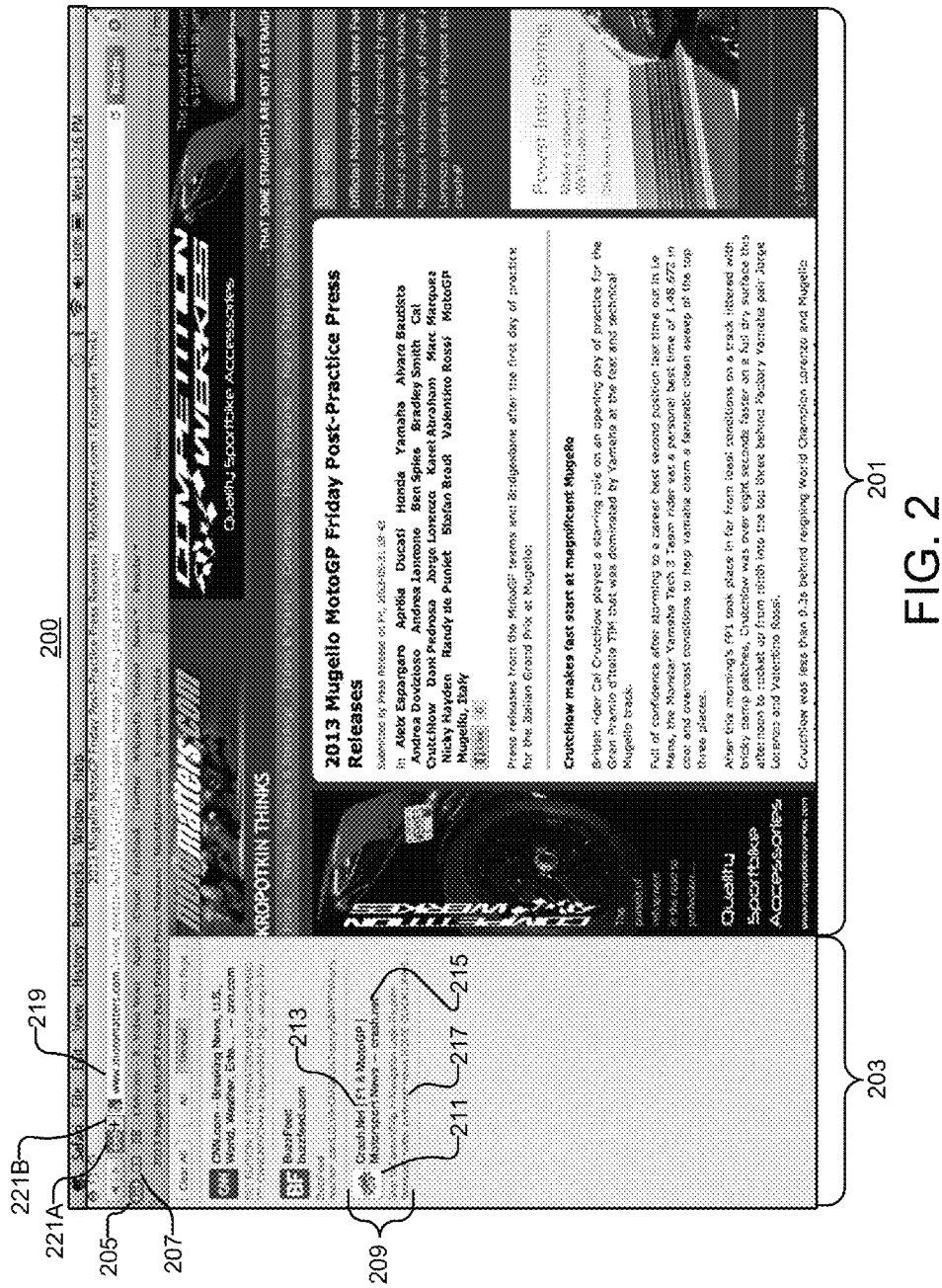
FIGS. 2 and 3 are examples of graphical user interfaces of the content viewing application for adding an article to a reading list panel according to one embodiment.

Referring now to FIG. 2, a GUI 200 of the web browser application 109 is shown according to one embodiment. The GUI 200 of the web browser application 109 includes a main window 201. The web browser application 109 displays articles, such as web pages, in the main window 201. For example, when the browser application 109 is launched and accesses an address (e.g., a URL) of a content provider 103, a web page is received from the content provider 103, and displayed in the main window 201.

In one embodiment, the GUI 200 of the web browser application 109 includes a content list panel that is activated for display. In particular, GUI 200 shown in FIG. 2 includes a reading list panel 203 that is activated for display. Generally, content list panels (e.g., the reading list panel 203 and the bookmarks list panel 400 shown in FIG. 4) can be implemented as a sidebar window or an accessory window of the main window 201 of the web browser application 109.

In one embodiment, the GUI 200 includes a reading list UI element 205 (e.g., a button) that is used to activate the reading list panel 203. The reading list UI element 205 includes a visual indication that represents the reading list panel 203. The GUI 200 also includes a bookmarks UI element 207 that is used to activate the bookmarks list panel 400. In response to receiving a user selection of the reading list UI element 205 or the bookmarks UI element 207, the web browser application 109 activates and displays the content list panel associated with the selected UI element. Selection of UI elements optionally includes any type of input supported by the web browser application 109 or computing device 101, including clicks, touches, voice selection, keyboard inputs or the like.

Figure 4:
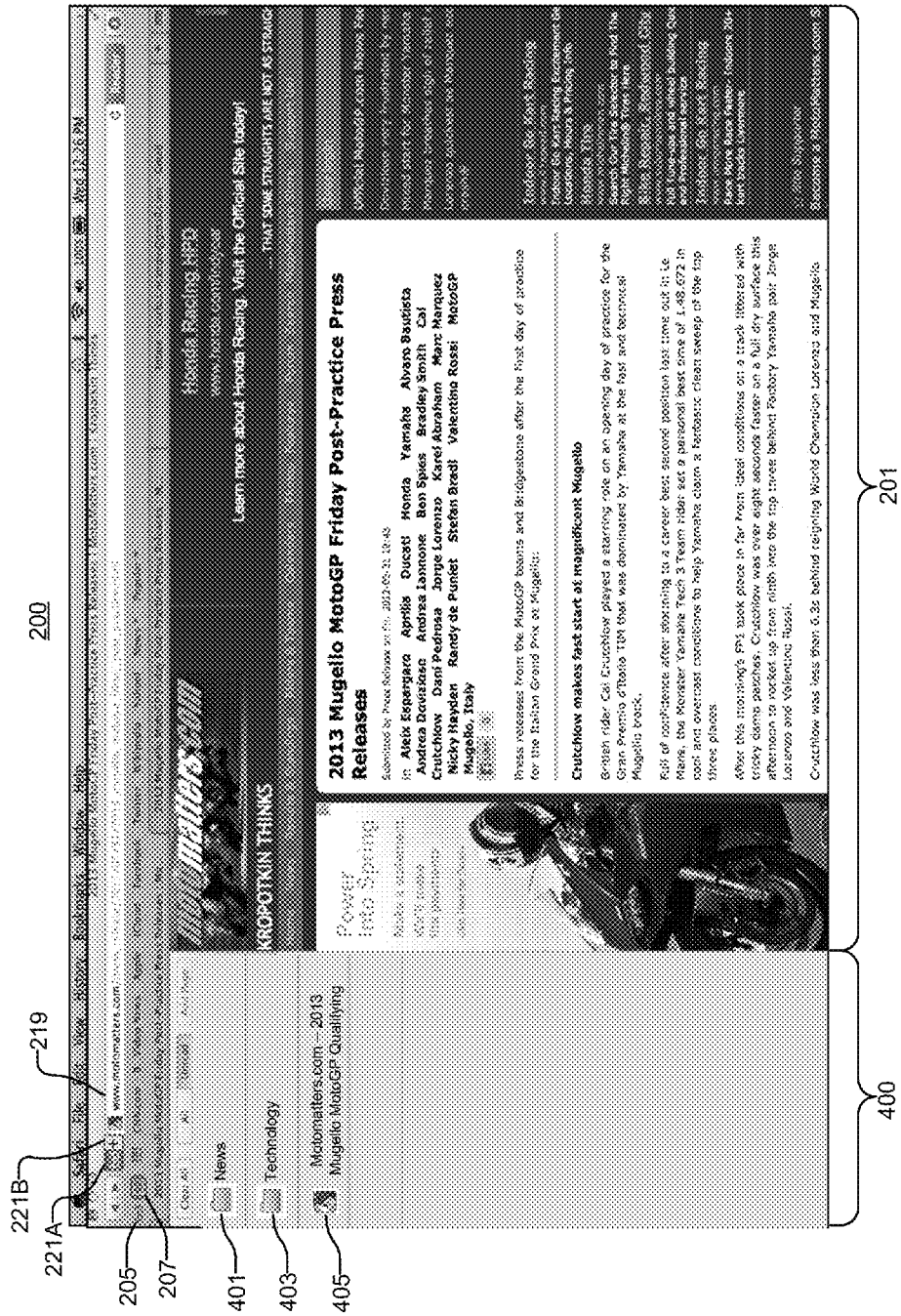

As shown in FIG. 2 and FIG. 4, the reading list panel 203 and the bookmarks list panel 400 are displayed to the left of the main window 201 responsive to the respective selection of the reading list UI element 205 or bookmarks list UI element 207. However, the reading list panel 203 and the bookmarks list panel 400 can be displayed in other positions that are proximate the main window 201 such as to the right of the main window 201 or at the bottom of the main window 201. Note that in this illustrated embodiment the reading list panel 203 and the bookmarks list panel 400 cannot be simultaneously displayed. Either the reading list panel 203 or the bookmarks list panel 400 is displayed in the GUI 200. The user optionally deactivates and removes either the reading list panel 203 or the bookmarks list panel 400 from display be reselecting its associated UI element or selecting the UI element associated with the content list panel that is deactivated. For example, if the reading list panel 203 is displayed, selection of the bookmarks list UI element 207 causes the reading list panel 203 to be dismissed (i.e., removed from display) and the bookmarks list panel 400 is displayed.

As shown in FIG. 2, the reading list panel 203 includes a list of article representations that have been added to the reading list panel 203 by the user. In one embodiment, an article representation includes enough information to identify the article associated with the article representation. The article representation include at least one of a title of the article, a link such as an address (e.g., a universal resource locator (URL)) from which the article can be retrieved (which may or not may be displayed), an abstract of the article (e.g., selected text from the article), and an icon (e.g., an image) representing the website from which the article is retrieved. Article representation 209 is one example of an article representation included in the reading list 203 shown in FIG. 2. Article representation 209 includes a title 213 of the article (e.g., "Crash.Net|F1 & MotoGP|Motorsports News"), an address 215 of the article (e.g., crash.net), an abstract 217 of the article, and an icon 211 representing the website from which the article is retrieved.

FIG. 4 is an example of one embodiment of a bookmarks list panel 400. The bookmarks list panel 400 is displayed in response to the user selecting the bookmarks UI element 207 as mentioned previously. As shown in FIG. 4, the bookmarks list panel 400 includes folders 401 and 403 of article representations. Folder 401 includes article representations associated with "News" whereas folder 403 includes article representations associated with "Technology" in the example shown in FIG. 4. The bookmarks list panel 400 also includes an article representation 405 of an article. In one embodiment, an article representation included in the bookmarks list panel 400 is a bookmark. Like the article representation included in the reading list panel 203, an article representation displayed in the bookmarks list panel 400 optionally includes at least one of a title of the article, an address (e.g., a universal resource locator (URL)) from which the article can be retrieved, an abstract of the article, and an image representing the website from which the article is retrieved.

In one embodiment, the web browser application 109 also includes a top sites mode. In the top sites mode, the main window 201 displays representations (e.g., thumbnail images) of one or more web sites that are associated with the user. The web sites represented in the top sites panel correspond to the user's most frequently visited web sites. The ordering of the top sites is based on time. Thus, most recently visited web sites are displayed closer to the top of the top sites whereas less recently visited top sites are displayed closer to the bottom of the top sites. Top sites are optionally removed from the top sites panel also based on time, for example, with sites being removed if they have not been accessed within the past 30 days.

Figure 10:
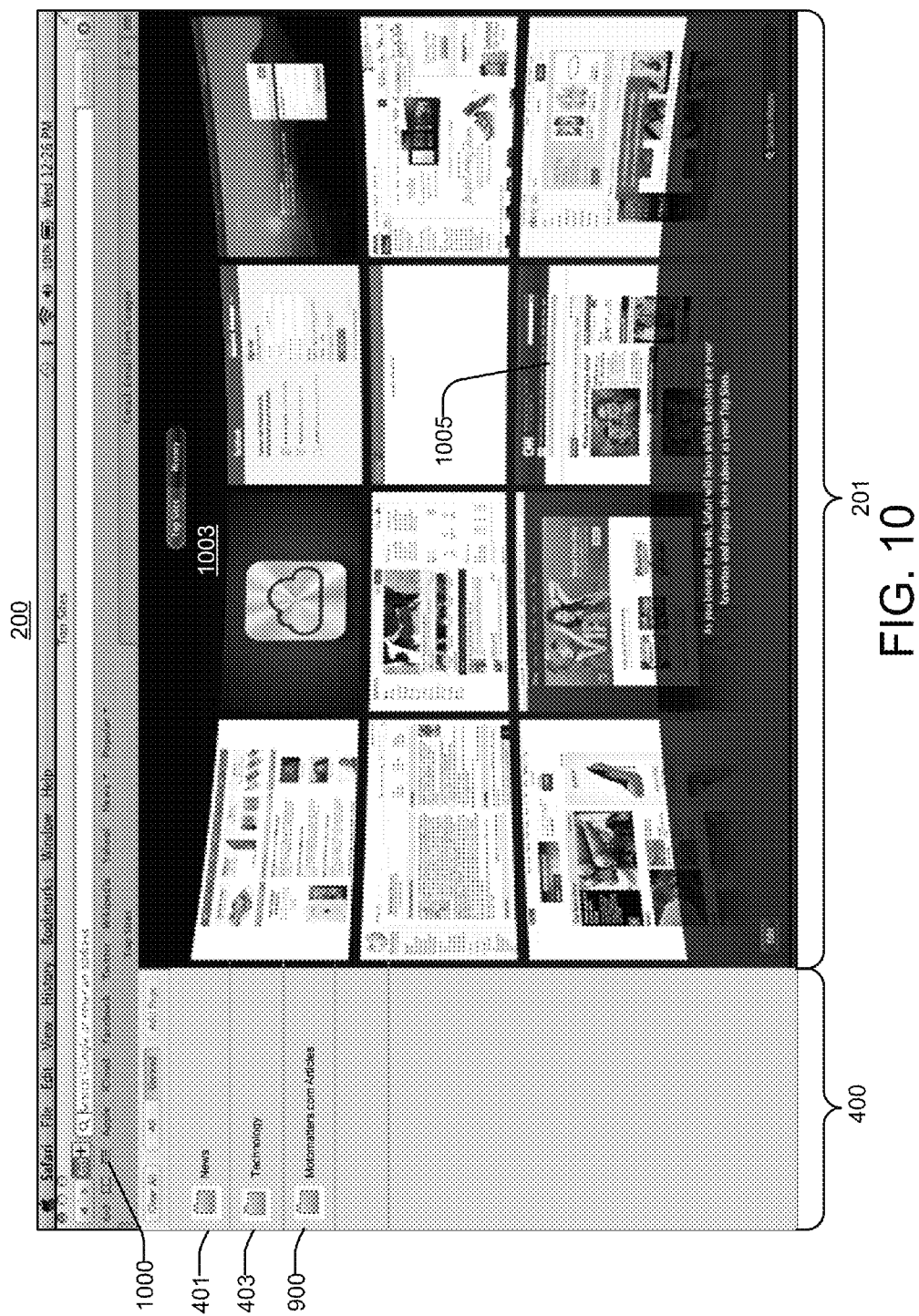
FIG. 10 is an example of a graphical user interface of top sites of the content viewing application according to one embodiment.

FIG. 10 is an example of the GUI 200 of the web browser application 109 including top sites according to one embodiment. As shown in FIG. 10, the main window 201 displays a wall 1003 of representations of one or more web sites (i.e., top sites) that represent the user's most frequently visited web sites. For example, thumbnail 1005 is a representation of the CNN website. In one embodiment, the GUI 200 of the web browser application 109 includes a top sites UI element 1000 in addition to the reading list UI element 205 and the bookmarks list UI element 207. In response to the user selecting (e.g., click or touch input) the top sites UI element 1000, the web browser application 109 causes the main window 201 to displays to the wall 1003 of top sites.

Referring back to FIG. 1, the web browser application 109 includes multiple modules. As is known in the art, the term "module" refers to computer program logic utilized to provide the specified functionality upon execution by the computing device 101. Other embodiments of the web browser application 109 and/or computing device 101 can have different and/or other modules than the ones described here, and that the functionalities can be distributed among the modules in a different manner.

In one embodiment, the web browser application 109 includes a content retrieval module 111. The content retrieval module 111 retrieves articles from the content provider 103. For example, the content retrieval module 111 retrieves web pages from the content provider 103 for display in the web browser application 109. As shown in FIG. 2, the GUI 200 includes an address bar 219 in which the address of a web page for retrieval is entered by the user. The content retrieval module 111 optionally retrieves an article from the content provider 103 for display in the main window 201 that is associated with the address included in the address bar 219. Alternatively, the content retrieval module 11 optionally retrieves an article represented in a content list panel upon selection of the article representation (e.g., click or touch input).

Referring back to FIG. 1, the web browser application 109 includes a content processing module 113. Generally, the content processing module 113 processes articles retrieved by the content retrieval module 111 to build a data structure such as a rendering tree that represents the article.

In one embodiment, a rendering tree includes one or more nodes. The rendering tree represents a topological or structural relationship among article elements represented as nodes in the rendering tree. Each node of the rendering tree represents an element of the article. An article element optionally includes document content and/or layout specifications, such as size attributes associated with a markup language tag (e.g., HTML tags in an HTML document) for presenting the document content. Some of the nodes optionally represent elements of the web page that are capable of being displayed in a reader mode such as headings, text, and images.

The web browser application 109 includes a content presentation module 115. The content presentation module 115 presents or displays an article on the computing device 101. In one embodiment, the content presentation module 115 renders an article on the computing device 101 based on a rendering tree that represents the article. The content presentation module 115 renders the article in the main window 201 of the web browser application 109 as shown in FIG. 2. The article is optionally displayed in response to a user submitting a URL to the web browser application 109. Alternatively, an article is optionally displayed in the main window 201 of the web browser application 109 in response to a selection (e.g., click or touch) of an article representation from a content list panel such as the reading list panel 203 or the bookmarks list panel 400 of the web browser application 109.

The content presentation module 115 presents a content list panel (e.g., reading list panel 203 or bookmarks list panel 400) upon activation of the content list panel. In particular, the content presentation module 115 accesses the stored information associated with the article representations of the reading list panel 203 and bookmarks list panel 400. The content presentation module 115 formats the information for each article representation for display in the reading list panel 203 and the bookmarks list panel 400 upon activation of each panel.

The web browser application 109 includes a reader mode module 117. The reader mode module 117 determines whether an article is capable of being displayed or presented in the reader mode. In one embodiment, the reader mode module 117 determines whether an article can be displayed in the reader mode based on the rendering tree associated with the article as described in U.S. patent application Ser. No. 12/794,674, entitled "Reader Mode Presentation of Web Content," filed Jun. 4, 2010, which is incorporated by reference herein in its entirety. If a determination is made that the article can be displayed in the reader mode, the reader mode module 117 displays an indication in the web browser application 109 that the article can be displayed in the reader mode.

The web browser application 109 includes a management module 119. Generally, the management module 119 manages content lists of the web browser application 109. In one embodiment, management of the content lists includes adding articles to content lists upon user request.

Referring back to FIG. 2, an add UI element 221 is included in the GUI 200 of the web browser application 200 in one embodiment. The add UI element 221 allows the user to add an article that is currently displayed in the main window 201 to a content list panel with a single selection action directed to the add UI element 221. In response to the selection of the add UI element 221, the management module 119 automatically adds an article representation of the article displayed in the main window 201 to a content list panel.

The management module 119 automatically adds an article representation to a default content list panel based on a length of time of the selection of the add UI element 221. For example, the management module 119 automatically adds the article representation to the default content list panel in response to a selection of the add UI element 221 that is less than a threshold amount of time (e.g., 3 seconds). Alternatively, the management module 119 automatically adds the article representation to the default content list panel in response to a selection of the add UI element 221 greater than the threshold amount of time. Either the reading list panel 203 or the bookmarks list panel 400 can be set as the default content list panel to receive the article representation. The default content list panel can be established in the user settings of the web browser application 109.

In one embodiment, the add UI element 221 includes a visual indication 221A of the default content list panel. For example, the visual indication 221A of the add UI element 221 shown in FIG. 2 is a pair of glasses thereby visually indicating that the reading list panel 203 is the default content list panel. Thus, selection of the add UI element 221 less than the threshold amount of time results in the article being automatically added to the reading list panel 203. However, the bookmark lists panel 400 is optionally set as the default content list panel in other embodiments. If the bookmark lists panel 400 is the default content list panel, the visual indication 221A of the add UI element 221 would be an image of a book for example.

Furthermore, the add UI element 221 also includes a visual indication 221B of the state of the add UI element 221 in one embodiment. The state of the add UI element 221 visually indicates whether or not an article has already been added to a content list panel. In one embodiment, the visual indication 221B is optionally either a plus symbol (e.g., "+") that visually indicates that the article representation has not yet been added to the content list panel, or the visual indication 221B is optionally a check symbol (e.g., "√") indicating that the article has been added to the content list panel.

Figure 3:
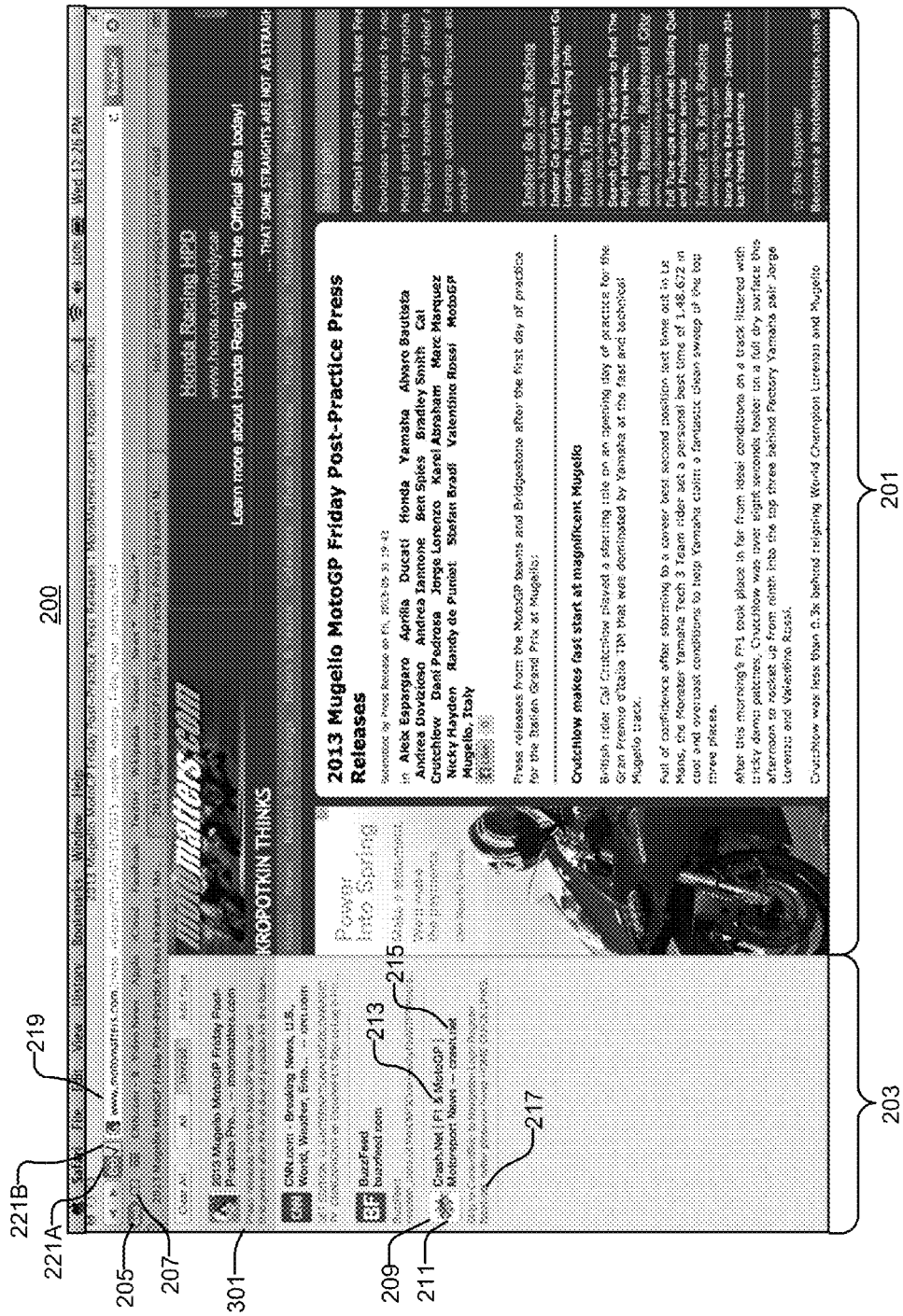

As shown in FIG. 2, the visual indication 221A of the add UI element 221 visually indicates that the reading list panel 203 is the default content list panel and the visual indication 221B of the state of the add UI element 221 visually indicates whether the article should be added to the reading list panel 203. If the user selects the add UI element 221 for less than the threshold amount of time, the management module 119 adds an article representation corresponding to the article displayed in the main window 201 to the reading list panel 203. FIG. 3 is an example of the GUI 200 illustrating that an article representation 301 corresponding to the article displayed in the main window 201 has been added to the reading list panel 203 according to one embodiment. Furthermore, the visual indication 221B of the add UI element 221 is updated to display the check symbol visually indicating that the article representation 301 has been added to the reading list 203. This is beneficial since it allows the user to know that the article has been added, even if the reading list 203 itself is not displayed at that time.

In one embodiment, the management module 119 creates the article representation of an article based on the article itself. The management module 119 scans at least a portion of an article that is requested to be added to a content list panel in response to a request to add the article to a content list panel. The management module 119 scans the article to extract information associated with the article such as an abstract of the article. The management module 119 also optionally extracts metadata about the article such as the title of the article and URL address. The management module 119 also optionally extracts a graphical representation such as an icon that is associated with the content provider 103 from which the article was received. As described above, the extracted information is included in the article representation of the article that is displayed in the content lists.

The management module 119 also optionally adds the article displayed in the main window 201 of the web browser application 109 to the content list that is not the default content list item responsive to selection of the add UI element 121. For example, the management module 119 optionally adds the article to the bookmarks list panel 400 rather than the reading list panel 203 responsive to the selection of the add UI element 221. In one embodiment, if the add UI element 121 is selected for more than threshold amount of time (e.g., 3 seconds), the management module 119 adds an article representation of the article displayed in the main window 201 to the non-default content list panel such as the bookmarks list panel 400. Thus, if the add UI element 121 is selected for more than 3 seconds for example, the article representation of the article is saved to the default content list panel and if the add UI element 121 is selected for less than 3 seconds, the article representation of the article is saved to the non-default content list panel. Alternatively, the management module 119 adds the article representation of the article displayed in the main window 201 to the non-default content list panel if the add UI element 121 is selected for less than the threshold amount of time.

Figure 5:
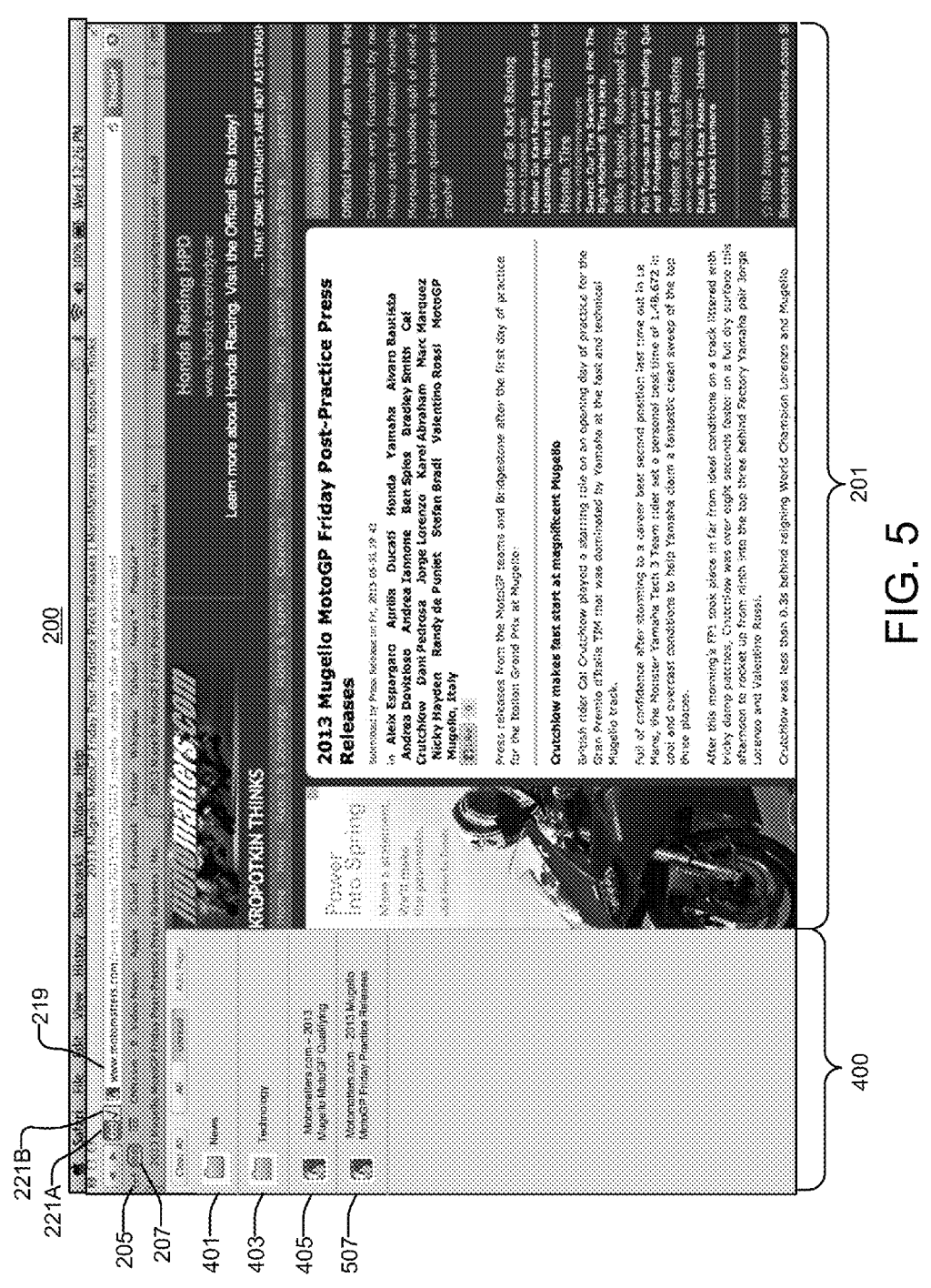

FIG. 5 is an example illustrating the GUI 200 after the article displayed in the main window 201 of the web browser application 109 has been bookmarked according to one embodiment. As shown in FIG. 5, the visual indication 221B of the state of the add UI element 121 indicates that the article has been added to the bookmarks list panel 400 even though the visual indication 221A indicates that the reading list panel 203 is the default content list panel. As shown in FIG. 5, the bookmarks list panel 400 now includes article representation 507 corresponding to the article displayed in the main window 201. In one embodiment, the reading list panel 203 is dismissed and the bookmarks list panel 400 is displayed with the added article representation 507 if the reading list panel 203 was previously displayed when the add UI element 121 was selected for greater than the threshold amount of time.

Figure 6:
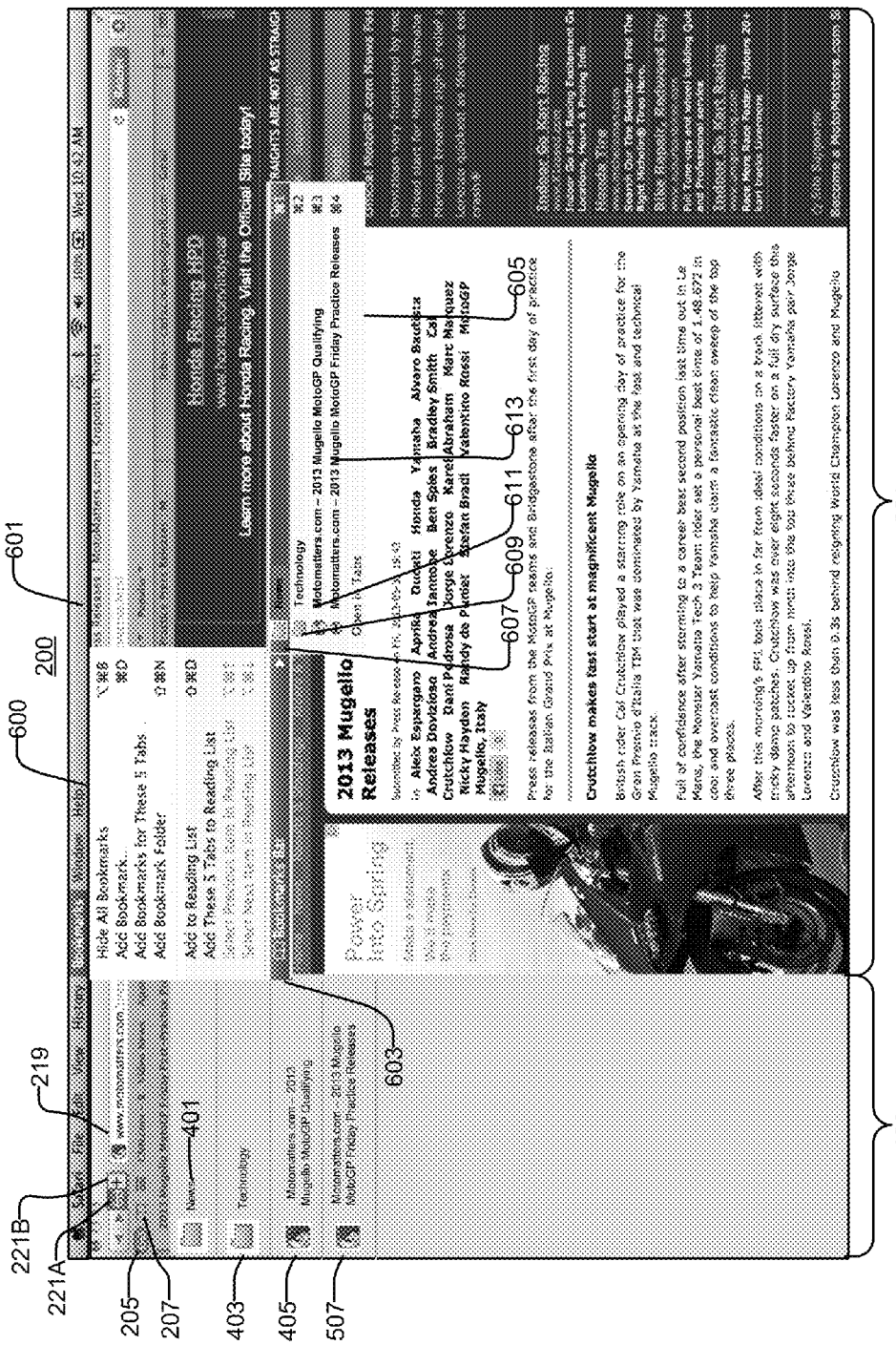
FIG. 6 is an example of a graphical user interface of a bookmarks menu of the content viewing application according to one embodiment.

In one embodiment, management of content lists also includes edits (i.e., revisions) of article representations included in content lists. In one embodiment, revisions of article representations can occur directly in a menu associated with a content list. FIG. 6 is an example of a bookmarks menu 600. The bookmarks menu 600 is a drop down menu of a toolbar 601 of the web browser application 109. The bookmarks menu 600 includes one or more bookmark menu items that are each related to bookmarks functionality such as hiding bookmarks, adding a bookmark, etc.

As shown in FIG. 6, the bookmarks menu 600 includes a bookmarks bar menu item 603. If the user selects the bookmarks bar menu item 603, a bookmarks bar menu 605 is displayed. Generally, the bookmarks bar menu 605 includes menu items corresponding to content list items included in the bookmarks panel 400 such as a "News" folder 607, "Technology" folder 609, article menu item 611, and article menu item 613.

In one embodiment, the management module 119 optionally receives requests from the user to revise (edit) menu items (e.g., article menu items and folders) directly in the bookmarks bar menu 605. In one embodiment, the request to edit the text of an article menu item optionally comprises a double-click, or double-tap, long-click, long-tap on an article representation. Other actions are optionally performed to indicate the request such as user selection of a menu item to edit the title of the article menu item. Example revisions to a menu item include editing a title of menu item or the position of a menu item directly in the bookmarks bar menu 605. The management module 119 activates an edit mode for the bookmarks bar menu 605 and receives inputs of the edits of menu items directly in bookmarks bar menu 605. The revisions are performed directly in the bookmarks bar menu 605 without displaying a modal dialog box to enter the edits. The edits are saved once the user clicks out of the menu item, or inputs a keyboard ENTER.

In one embodiment, the bookmarks bar menu 605 is a table object that is stylized to appear as a menu, rather than being implemented as a menu object per se. Each menu item is placed in a defined row in the table object. Table objects can be directly edited compared to menu objects, which cannot. Since the bookmarks bar menu 605 is a table object rather than a menu object, users can thus directly edit menu items (e.g., article representations or folders) included in the bookmarks bar menu 605 without the need to invoke a modal dialog box to implement revisions.

In one example, the management module 119 optionally receives a revision of a title of an article menu item directly in the bookmarks bar menu 605 without displaying a modal dialog box. In one embodiment, the management module 119 displays a text field in the article menu item included in the bookmarks bar menu 605 if a request to edit the title of the article menu item is received. The text field allows the user to edit text (e.g., the title) associated with the article menu item directly in the bookmarks bar menu 605.

Figure 7:
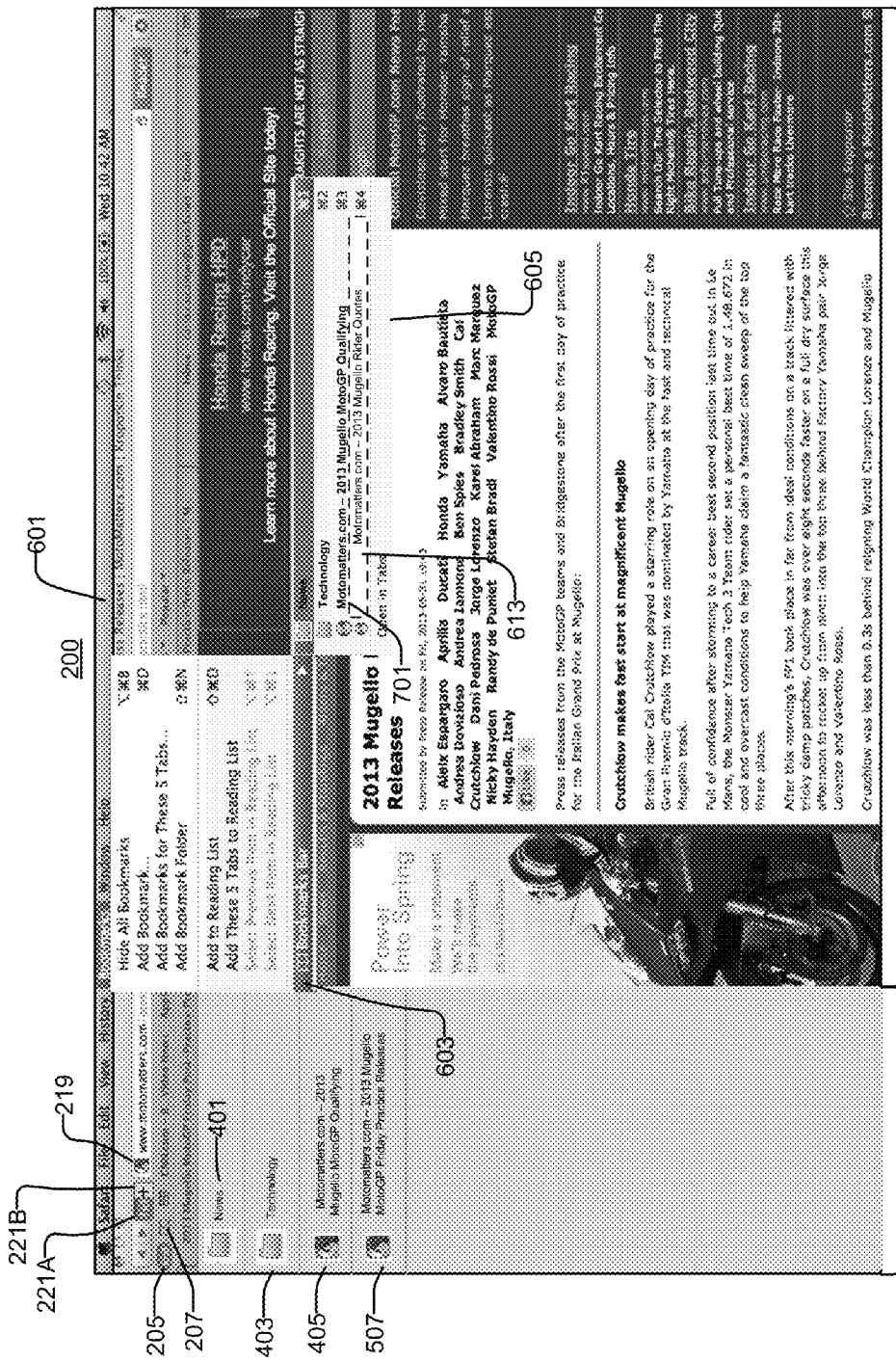
FIG. 7 is an example of a graphical user interface of the content viewing application for editing a bookmark in the bookmarks menu according to one embodiment.

FIG. 7 is an example of the GUI 200 of the web browser application illustrating in-line editing of the title of article menu item 613 according to one embodiment. As shown in FIG. 7, a text field 701 is displayed in the article menu item 613 of the bookmarks bar menu 605 in response to a request to edit the title of the article menu item 613. The user can revise the title of the article menu item 613 directly in the bookmarks bar menu 605 via the text field 701. In the example shown in FIG. 7, the user has changed the title of article menu item 613 from "Motomatters.com—2013 Mugello MotoGP Friday Practice Releases" to "Motomatters.com—Rider Quotes." Once the revision is finalized, the management module 119 updates the corresponding article representation 507 in the bookmarks list panel 400 to display the revised title of the article menu item 613 included in the bookmarks bar menu 605. Similarly, if article representation 507 were edited in the bookmarks list panel 400, the management module 119 updates the corresponding article menu item 613 in the bookmarks bar menu 605 to display the revisions to the article representation 507 included in the bookmarks list panel 400.

Another type of revision that is supported by the management module 119 is reordering of the menu items. The user can edit the order of menu items directly in the bookmarks bar menu 605 without the use of a modal dialog box to edit the ordering. The management module 119 receives a selection of a menu item from the bookmarks bar menu 605 and an indication a placement of the menu item in a desired position within the bookmarks bar menu 605 to signify a request to reorder the menu items included in the bookmarks bar menu 605. In response to the request, the management module 119 saves the updated order of the menu items.

Another type of revision that is supported by the management module 119 is the creation and management of folders for menu items. The management module 119 can create a folder of article menu items directly in the bookmarks bar menu 605 of the web browser application 109 in direct response to a request from the user, without displaying a modal dialog box. The request optionally includes an indication of the user selecting a first article menu item and dragging the first article menu item over of a second article menu item such that a threshold percentage (e.g., 80%) of the first article menu item overlaps the second article menu item for some minimum amount of time. In response, the management module 119 creates a folder in the menu itself, where the folder includes the first article menu item and the second article menu item.

Figure 8:
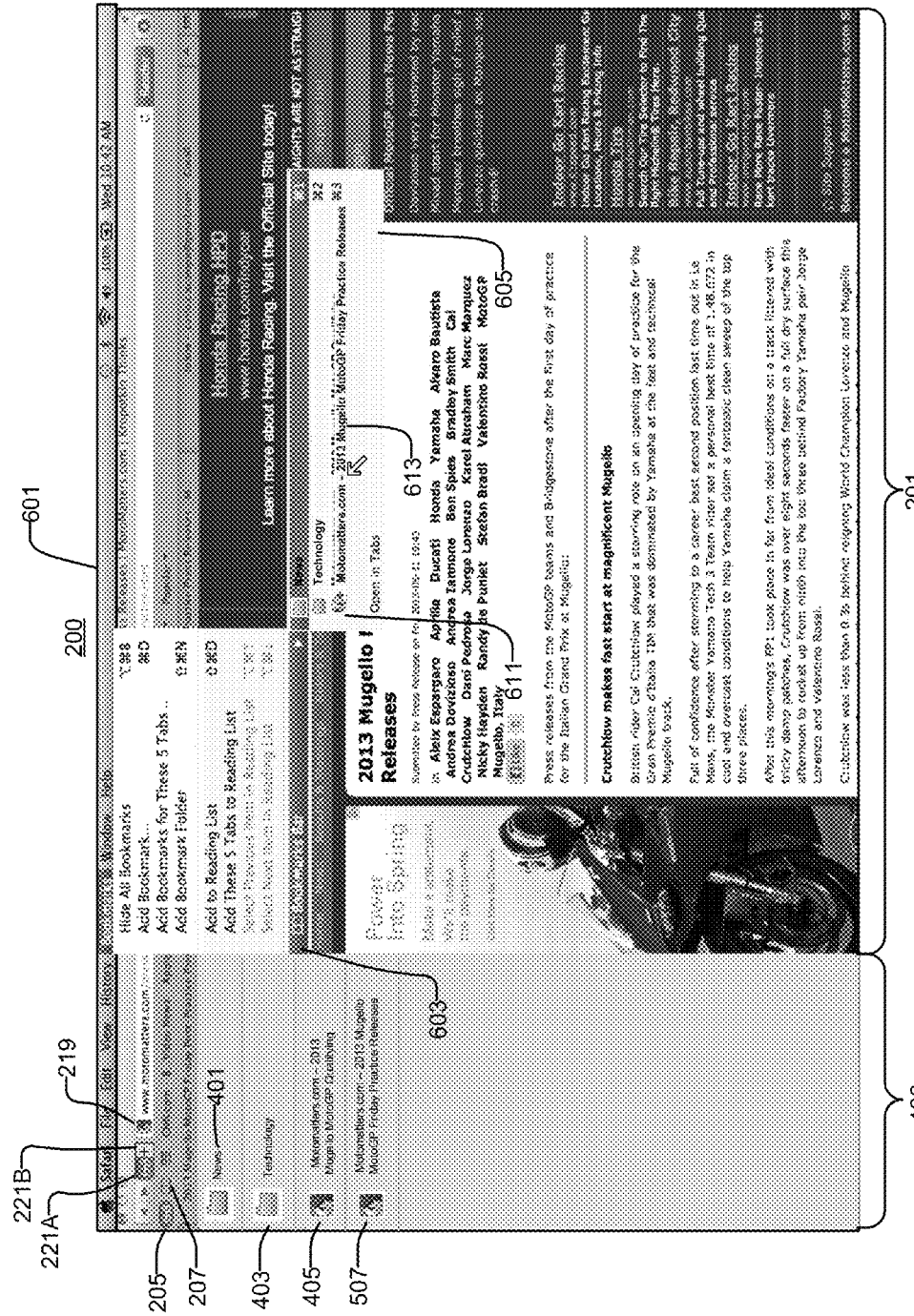
FIGS. 8 and 9 are examples of graphical user interfaces of the content viewing application for creating a folder in the bookmarks list panel according to one embodiment.
Figure 9:
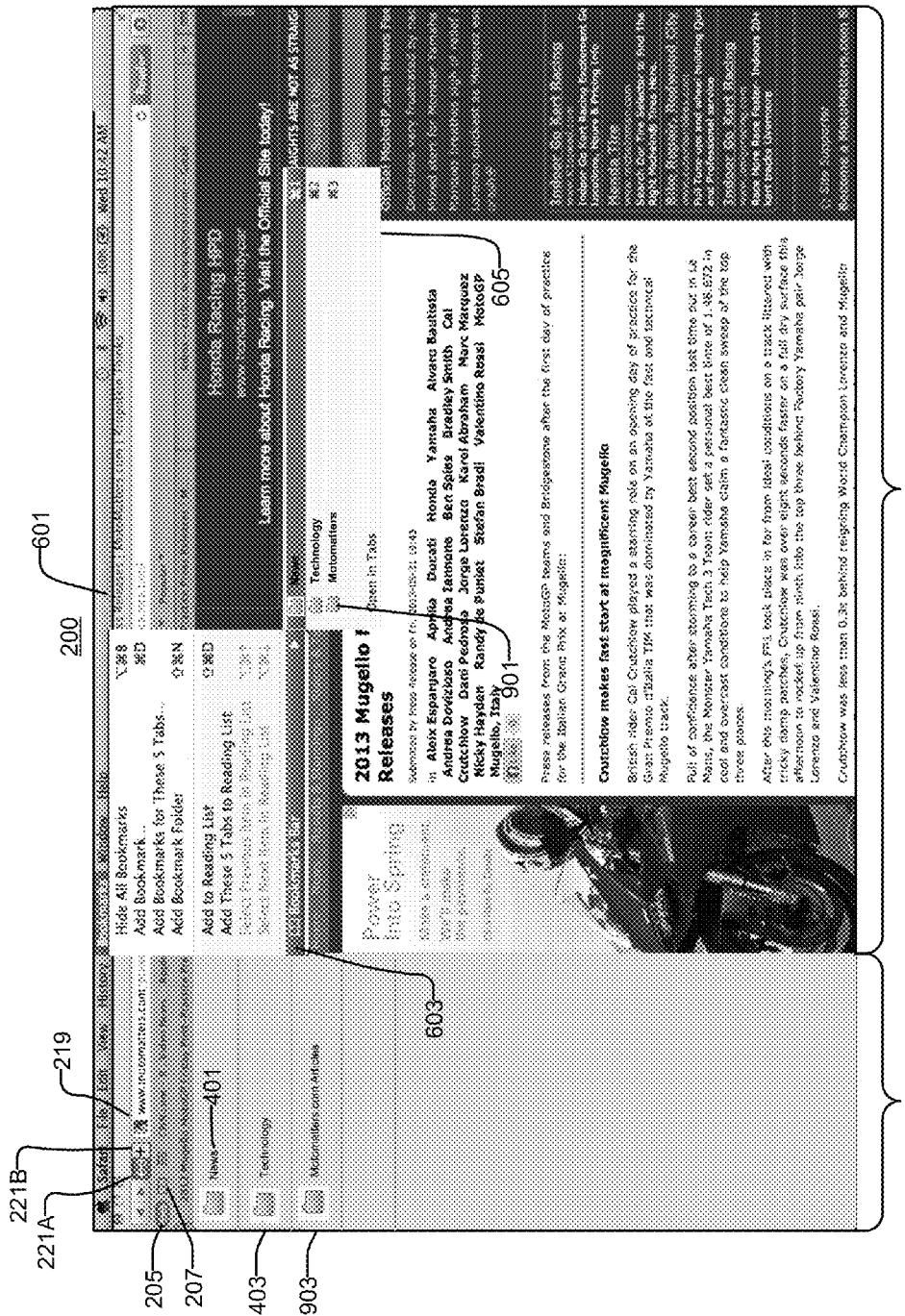

FIGS. 8 and 9 are examples of the GUI 200 illustrating how to create a folder in the bookmarks bar menu 605 according to one embodiment. In FIG. 8, the management module 199 receives a user selection (e.g., click and hold or touch and hold) of an article menu item 613 and an indication that the article menu item 613 is dragged over article menu item 611 for a minimum amount of time. The management module 119 interprets the user inputs as a request to create a folder that includes article menu item 611 and article menu item 613.

FIG. 9 is an example of the GUI 200 illustrating the creation of a folder in the bookmarks bar menu 605. As shown in FIG. 9, a folder 901 is created in response to the user dragging and dropping article menu item 611 on article menu item 613. Although not shown in FIG. 9, in response to the user dragging and dropping the article menu item 611 on article menu 613, the management module 199 displays folder 901 and a text field from which the management module 199 receives the user's title for the folder. In FIG. 9, folder 901 includes both article menu item 611 and article menu item 613 and has a title "Motomatters.com Articles" which was provided by the user. The management module 199 updates the bookmarks list panel 400 to include a folder 903 corresponding to the folder 901 displayed in the bookmarks bar menu 605 once folder 901 is created in the bookmarks bar menu 605 and vice versa.

As mentioned previously, the web browser application 109 includes a top sites mode. In one embodiment, the wall 1003 of top sites is integrated with the content list panels described above. For example, the user optionally adds a top site from the wall 1003 to the reading list panel 203 and/or bookmarks list panel 400. In one embodiment, the management module 119 optionally adds a top site to a content list panel in response to a request by the user to add the top site to the content list panel. For example, the request is optionally indicated by the user placing a top site in the content list panel.

Figure 11:
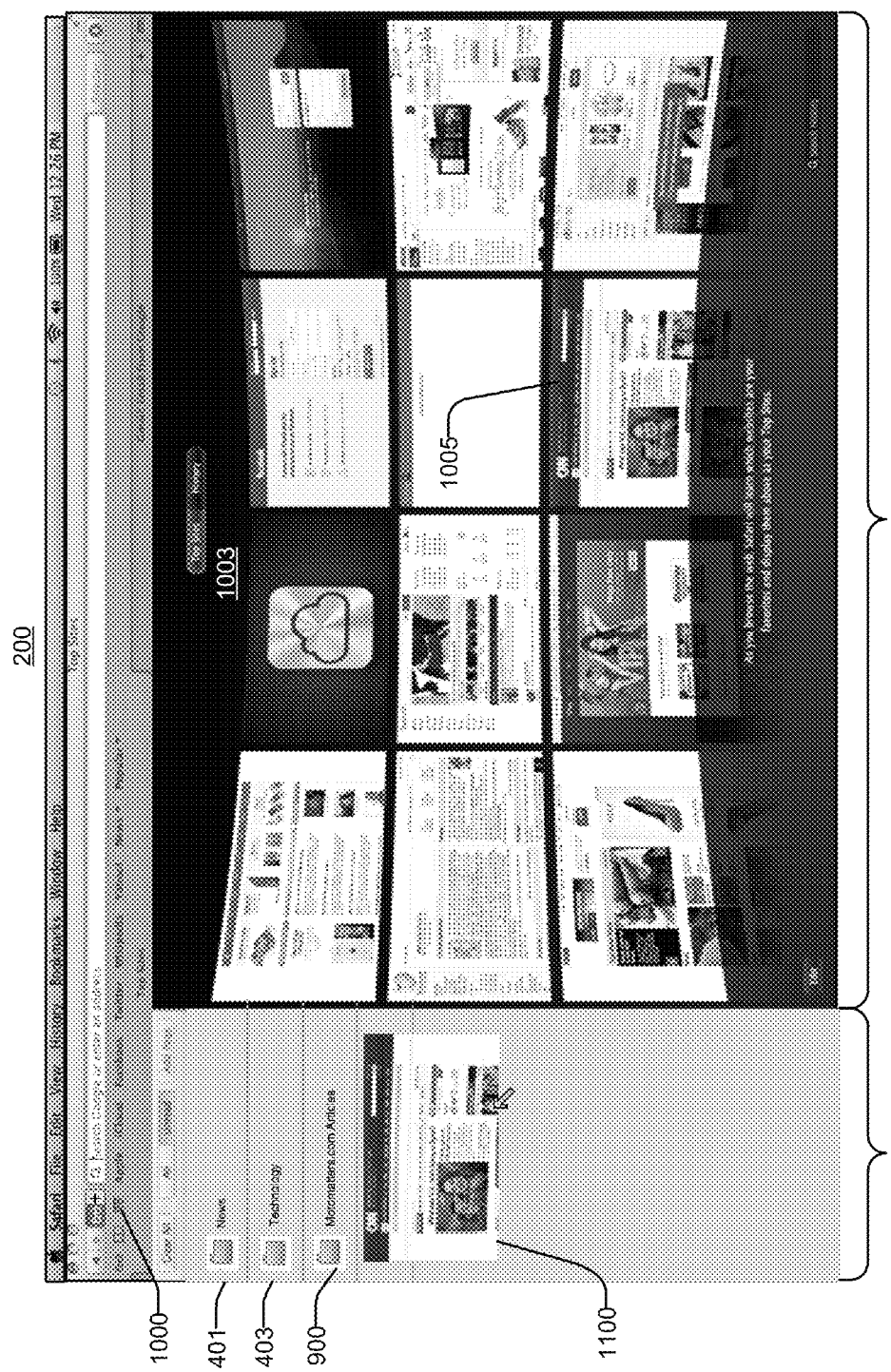
FIGS. 11 and 12 are examples of a graphical user interface for creating a bookmark of one of the top sites of the content viewing application according to one embodiment.
Figure 12:
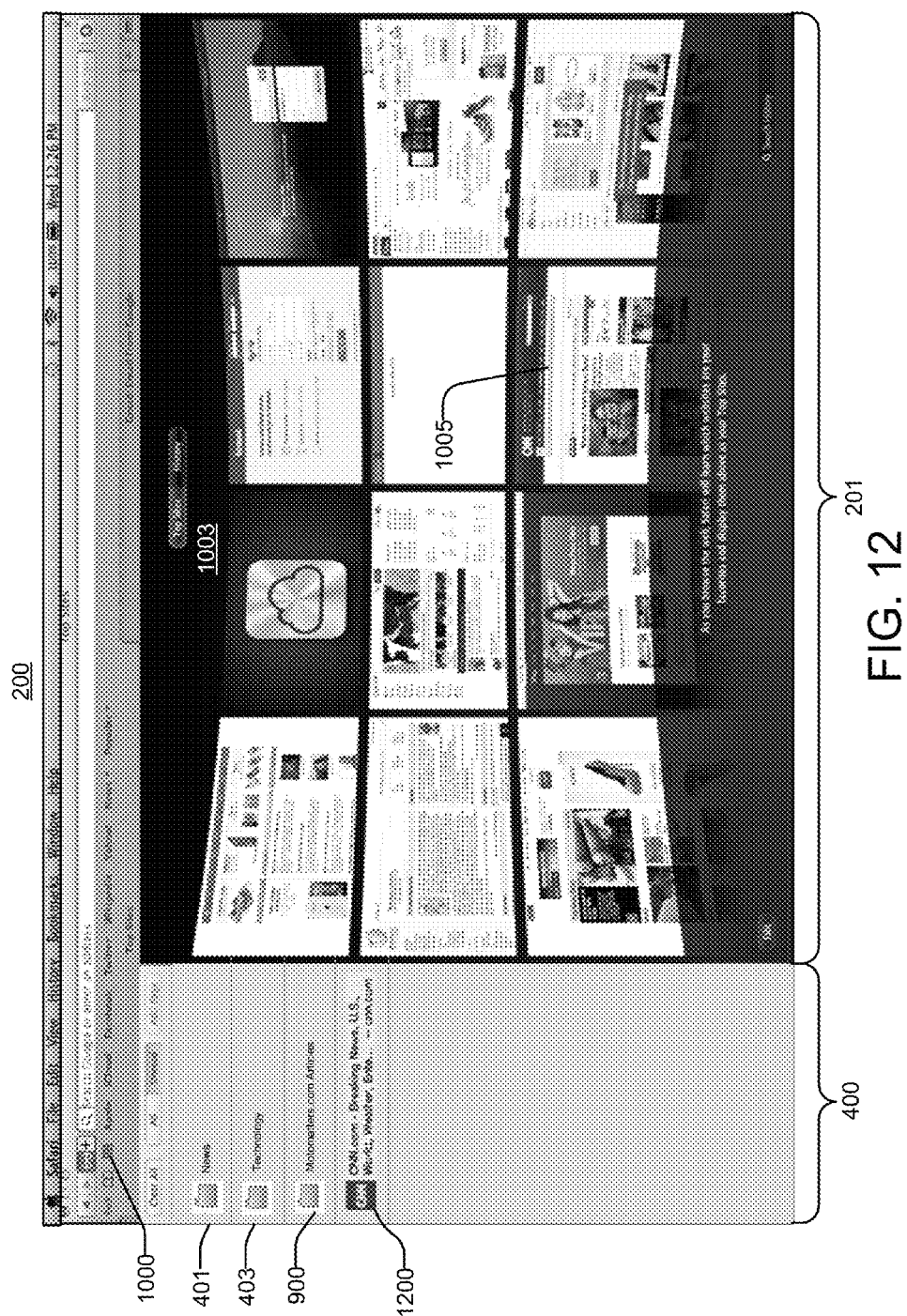

FIG. 11 is an example of the GUI 200 of the web browser application 109 illustrating how to add a top site to the bookmark list panel 400. Note that a top site can also be added to the reading list panel 203 using the steps discussed below. In FIG. 11, the user has selected the representation 1005 of the CNN website from the wall 1003 for a threshold amount of time (e.g., 1 second). Selection for the threshold amount of time of the representation 1005 causes the management module 119 to display an image 1100 of the web site 1005. As shown in FIG. 11, the user has moved the image 1100 to the bookmark list panel 400 and placed the image 1100 in the bookmark list panel 400. After the image 1100 is placed in the bookmark list panel 400, the management module 119 creates an article representation for the associated article that is added to the bookmarks list panel 400. FIG. 12 is an example of the GUI 200 of the web browser application 109 illustrating the addition of an article representation of a top site in the bookmark lists panel 400. As shown in FIG. 12, the bookmark lists panel 400 includes article representation 1200 in the bookmark list panel 400 that corresponds to top site 1005.

Returning back to FIG. 1, the computing device 101 also includes a content synchronization module 123. In one embodiment, the content synchronization module 123 optionally synchronizes article information (e.g., address, abstract, source, image of source, etc.) stored in the article database 121 by the management module 119 in a cloud server 1205 such as iCloud™ available from Apple® Inc. of Cupertino, California. As shown in FIG. 1 the cloud server 105 includes a content synchronization module 125 and an article database 121 which respectively perform similar functionality as the content synchronization module 123 and article database 121 of the computing device 101.

By synchronizing the article representations of the content item lists displayed on the computing device 101, the user can recreate the content item lists displayed in the web browser application 109 in another computing device of the user. For example, when the user subsequently connects with the cloud server 105 via a second computing device (e.g., a mobile device) of the user, the articles stored in the article database 121 can be synchronized between the cloud server 105 and the second device. When the user launches a web browser application from the second device, the content lists are populated with the article representations included in the content list panels displayed in the web browser application 109 of the computing device 101. As a result, the user can view articles created in the computing device 101 on the second device.

Method Flow Diagrams

Figure 13:
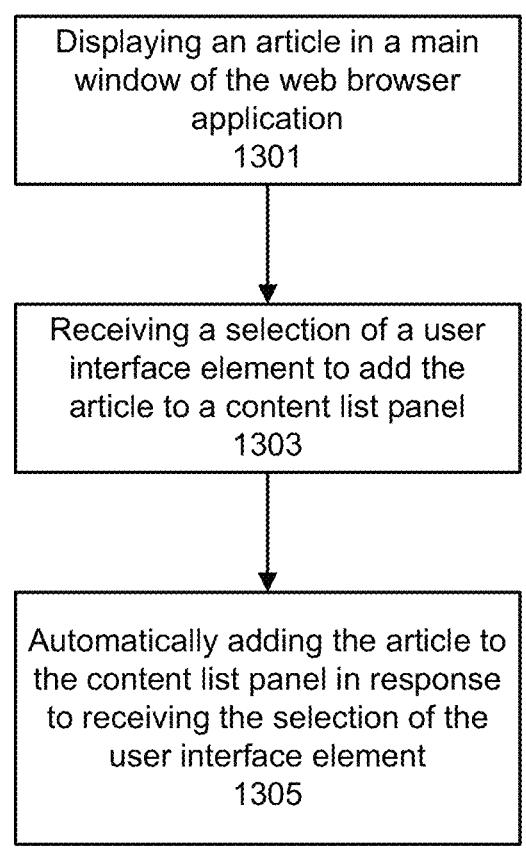
FIG. 13 is a method flow diagram for adding an article to a content list in the content viewing application according to one embodiment.

Referring now to FIG. 13, a method flow diagram is shown that describes a method for adding an article to a content list panel according to one embodiment. In one embodiment, the method for adding an article to the content list panel optionally includes other steps other than those shown in FIG. 13.

In one embodiment, the computing device 101 displays 1301 an article (e.g., a web page) in a main window 201 of the web browser application 1203. As shown in FIG. 2, the computing device 1201 displays an article titled "2013 Mugello MotoGP Friday Post-Practice Press Releases" in the main window 201 of the web browser application 109.

The computing device 101 receives 1303 a selection of a user interface element to add the article to a content list panel. For example, the computing device 1201 receives a selection of the add UI element 221 to add the article to either the reading list panel 203 or bookmarks list panel 400 based upon the duration of the selection of the add UI element 221. The computing device 1201 automatically adds 1305 the article to appropriate content list panel in response to receiving the selection of the user interface element. In one embodiment, the computing device 101 creates an article representation of the article and displays the article representation in the content list panel. As shown in FIG. 2, the article representation optionally includes a title 213 of the article, an address 215 of the article, and an image representation 211 of the source of the article.

Figure 14:
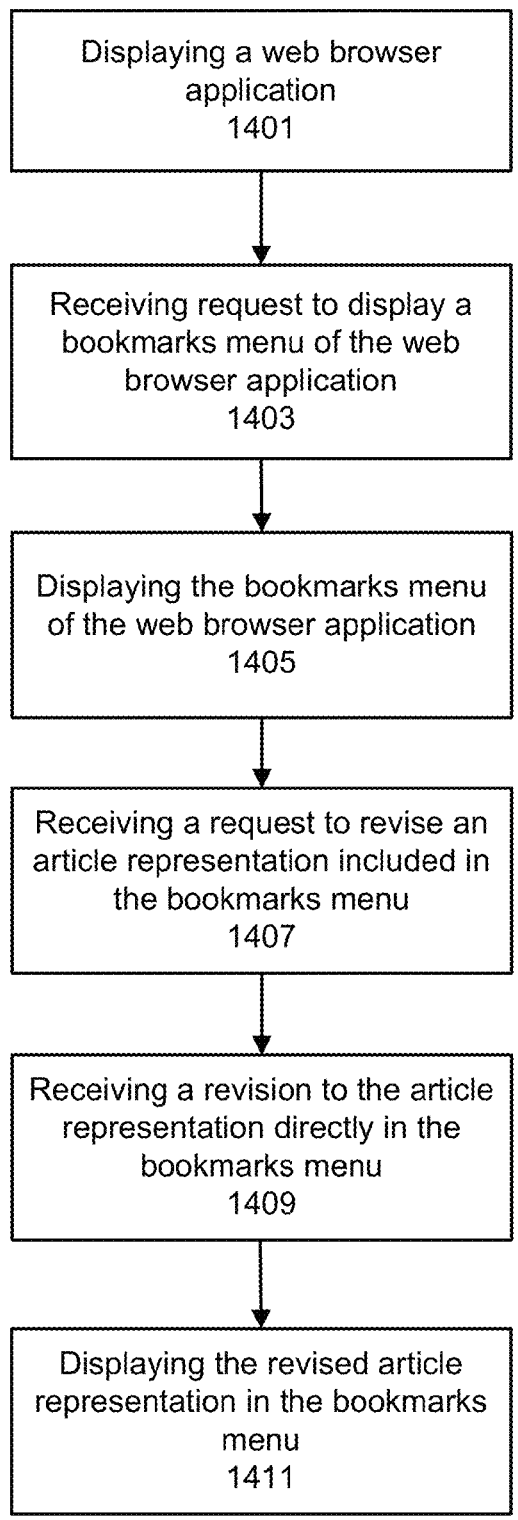
FIG. 14 is a method flow diagram for editing an article representation included in a bookmarks menu according to one embodiment.

FIG. 14 is a method flow diagram for editing an article representation of a bookmarks menu (e.g., the bookmarks bar menu 605) according to one embodiment. The method for editing an article representation of a bookmarks menu optionally includes other steps other than those shown in FIG. 14.

In one embodiment, the computing device 101 displays 1401 a web browser application 109. The computing device 101 receives 1403 a request to display a bookmarks menu of the web browser application 109 such as the bookmarks bar menu 605. The computing device 101 displays 1405 the bookmarks menu in response to the request. The bookmarks menu includes one or more menu items such as article representations of articles that have been bookmarked by the user.

The computing device 101 receives 1407 a request to revise an article representation included in the bookmarks menu. For example, the computing device 101 receives a request to revise a title of the article representation. In another example, the computing device 101 receives a request to change the position (i.e., order) of the article representation in the bookmarks menu.

In response to receiving the request, the computing device 101 receives 1409 a revision to the article representation directly in the bookmarks menu without the use of a modal dialog box to implement the revision. For example, a text field 701 is displayed in the article representation that allows the user to revise the title of the article representation directly in the bookmarks bar menu 605 as shown in FIG. 7. Alternatively, the user optionally changes the position of the article representation in the bookmarks bar menu 605 by dragging and dropping the article representation to a desired position. The computing device 101 then displays 1411 the revised article representation in the bookmarks menu based on the received revisions.

Figure 15:
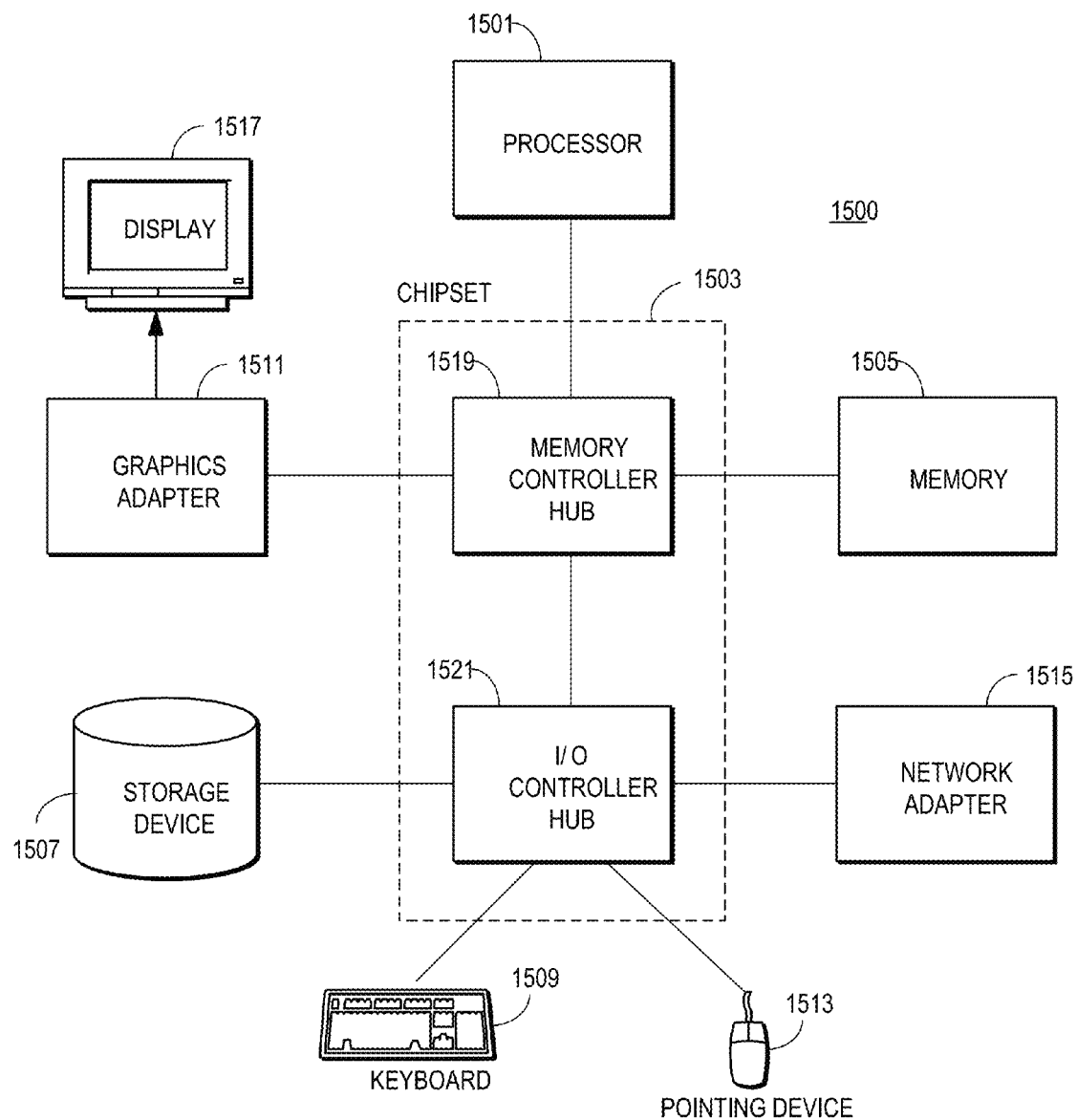
FIG. 15 illustrates a high-level block diagram illustrating a typical computer for acting as the computing device and/or cloud server according to one embodiment.

Note that although the methods of FIG. 14 and FIG. 15 have been separately described, the methods of FIG. 14 and FIG. 15 are combinable.

FIG. 15 is a high-level block diagram of a computer 1500 for acting as the computing device 101 and/or the cloud server 105 according to one embodiment. Illustrated are at least one processor 1501 coupled to a chipset 1503. Also coupled to the chipset 1503 are a memory 1505, a storage device 1507, a keyboard 1509, a graphics adapter 1511, a pointing device 1513, and a network adapter 1515. A display 1517 is coupled to the graphics adapter 1511. In one embodiment, the functionality of the chipset 1503 is provided by a memory controller hub 1519 and an I/O controller hub 1521. In another embodiment, the memory 1505 is coupled directly to the processor 1501 instead of the chipset 1503.

The storage device 1507 is any non-transitory computer-readable storage medium, such as a hard drive, compact disk read-only memory (CD-ROM), DVD, or a solid-state memory device. The memory 1505 holds instructions and data used by the processor 1501. The pointing device 1513 is a mouse, track ball, touch panel, or other type of pointing device, and is used in combination with the keyboard 1509 to input data into the computer system 1500. The graphics adapter 1511 displays images and other information on the display 1517. In one embodiment, display 1517 is a touch screen that is a touch sensitive surface for inputting data into the computer system 1500. The network adapter 1515 couples the computer system 1000 to a local or wide area network.

As is known in the art, a computer 1500 can have different and/or other components than those shown in FIG. 15. In addition, the computer 1500 can lack certain illustrated components. In one embodiment, a computer 1500 acting as the cloud server 105 lacks a keyboard 1509, pointing device 1513, graphics adapter 1511, and/or display 1517. Moreover, the storage device 1507 can be local and/or remote from the computer 1500 (such as embodied within a storage area network (SAN)). As is known in the art, the computer 1500 is adapted to execute computer program modules for providing functionality previously described herein. In one embodiment, program modules are stored on the storage device 1507, loaded into the memory 1505, and executed by the processor 1501.

The disclosure herein has been described in particular detail with respect to one possible embodiment. Those of skill in the art will appreciate that other embodiments are optionally practiced. First, the particular naming of the components and variables, capitalization of terms, the attributes, data structures, or any other programming or structural aspect is not mandatory or significant, and the mechanisms that implement the invention or its features have different names, formats, or protocols. Also, the particular division of functionality between the various system components described herein is merely exemplary, and not mandatory; functions performed by a single system component are instead performed by multiple components, and functions performed by multiple components are instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems are also used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages optionally are used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A computer-implemented method for adding an article to a content list panel, the method comprising:
    displaying, on a device, a web browser application comprising a main window displaying an article and an individual user interface element associated with a plurality of distinct content lists that include a first content list and a second content list, wherein the individual user interface element is user selectable to automatically add the article to either the first content list or the second content list;
    receiving a selection of the individual user interface element to add an article representation of the article displayed in the main window to either the first content list or the second content list from the plurality of content lists;
    determining whether to add the article representation of the article to the first content list or the second content list based on whether the selection of the individual user interface element is less than a threshold amount of time or greater than the threshold amount of time;
    adding the article representation to the first content list from the plurality of distinct content lists responsive to the selection of the individual user interface element being less than the threshold amount of time; and
    adding the article representation to the second content list from the plurality of distinct content lists responsive to the selection of the individual user interface element being greater than the threshold amount of time;
    wherein the article representation is added to the determined content list without displaying a modal dialog box to add the article representation to the content list.

2. The computer-implemented method of claim 1, wherein displaying the web browser application comprises:
    displaying the main window of the web browser application;

receiving a request from a user of the device to activate a content list panel associated with one of the plurality of content lists; and displaying the content list panel proximate the main window responsive to receiving the request.

3. The computer-implemented method of claim 1, wherein the user interface element visually indicates one of the first content list or the second content list as a default content list in which the article representation will be added based upon a length of time of the selection of the individual user interface element.

4. The computer-implemented method of claim 3, wherein the individual user interface element displays a first icon indicative that the article representation has not yet been added to the default content list or the individual user interface element displays a second icon indicative that the article representation has been added to the default content list.

5. The computer-implemented method of claim 4, further comprising:

updating the individual user interface element to visually indicate that the article representation has been added to the determined content list responsive to the automatically adding the article representation to the determined content list.

6. The computer-implemented method of claim 1, wherein the article representation includes at least one of an abstract of the article, a link to the article, a title of the article, and an image representing a source of the article.

7. The computer-implemented method of claim 1, further comprising:

displaying a plurality of representations of articles in the main window of the web browser application, each representation representing a frequently viewed article;

receiving a request to add an article represented by one of the plurality of representations of articles to one of the plurality of content lists; and automatically adding an article representation of the article to the content list responsive to the request, the article representation added to the content list without displaying a modal dialog box.

8. A computer program product comprising a non-transitory computer readable storage medium storing executable code for adding an article to a content list panel, the code when executed performs steps comprising:

displaying, on a device, a web browser application comprising a main window displaying an article and an individual user interface element associated with a plurality of distinct content lists that include a first content list and a second content list, wherein the individual user interface element is user selectable to automatically add the article to either the first content list or the second content list;

receiving a selection of the individual user interface element to add an article representation of the article displayed in the main window to either the first content list or the second content list from the plurality of content lists;

determining whether to add the article representation of the article to the first content list or the second content list based on whether the selection of the individual user interface element is less than a threshold amount of time or greater than the threshold amount of time;

adding the article representation to the first content list from the plurality of distinct content lists responsive to the selection of the individual user interface element being less than the threshold amount of time; and adding the article representation to the second content list from the plurality of distinct content lists responsive to the selection of the individual user interface element being greater than the threshold amount of time;

wherein the article representation is added to the determined content list panel without displaying a modal dialog box to add the article representation to the content list.

9. The computer program product of claim 8, wherein displaying the web browser application comprises:

displaying the main window of the web browser application;

receiving a request from a user of the device to activate a content list panel associated with one of the plurality of content lists; and displaying the content list panel proximate the main window responsive to receiving the request.

10. The computer program product of claim 8, wherein the individual user interface element visually indicates one of the first content list or the second content list as a default content list in which the article representation will be added upon based upon a length of time of the selection of the individual user interface element.

11. The computer program product of claim 10, wherein the individual user interface element displays a first icon indicative that the article representation has not yet been added to the default content list or the individual user interface element displays a second icon indicative that the article representation has been added to the default content list.

12. The computer program product of claim 10, wherein the code when executed performs further steps comprising:

updating the individual user interface element to visually indicate that the article representation has been added to the determined content list responsive to the automatically adding the article representation to the determined content list panel.

13. The computer program product of claim 8, wherein the article representation includes at least one of an abstract of the article, a link to the article, a title of the article, and an image representing a source of the article.

14. The computer program product of claim 8, wherein the code when executed performs further steps comprising:

displaying a plurality of representations of articles in the main window of the web browser application, each representation representing a frequently viewed article;

receiving a request to add an article represented by one of the plurality of representations of articles to one of the plurality of content lists; and automatically adding an article representation of the article to the content list responsive to the request, the article representation added to the content list panel without displaying a modal dialog box.

15. A computer-implemented method of managing a content list panel, the method comprising:

displaying, on a device, a web browser application comprising a main window displaying an article and a user interface element associated with a plurality of content lists that include a first content list and a second content list, wherein the individual user interface element is user selectable to automatically add the article to either the first content list or the second content list;

receiving a selection of the user interface element to add an article representation of the article displayed in the main window to either the first content list or the second content list from the plurality of content lists;

determining whether to add the article representation of the article to the first content list or the second content list based on whether the selection of the individual user interface element is less than a threshold amount of time or greater than the threshold amount of time;

adding the article representation to the first content list from the plurality of distinct content lists responsive to the selection of the individual user interface element being less than the threshold amount of time;

adding the article representation to the second content list from the plurality of distinct content lists responsive to the selection of the individual user interface element being greater than the threshold amount of time, wherein the article representation is added to the content list panel without displaying a modal dialog box to add the article representation to the content list panel;

receiving a request to display a bookmarks drop down menu of the web browser application, the bookmarks drop down menu including an article menu item corresponding to the added article representation;

displaying the bookmarks drop down menu of the web browser application;

receiving a request to revise the article menu item included in the bookmarks drop down menu;

receiving a revision to the article menu item directly in the bookmarks drop down menu without displaying a modal dialog box to revise the article menu item; and displaying the revised article menu item in the bookmarks drop down menu based on the revision.

16. The computer-implemented method of claim 15, further comprising:
updating the article representation in the content list panel based on the revision to the article menu item in the bookmarks drop down menu.

17. The computer-implemented method of claim 15, wherein the user interface element visually indicates a default content list panel in which the article representation will be added based upon a length of time of the selection of the user interface element.

18. The computer-implemented method of claim 15, wherein the user interface element displays a first icon indicative that the article representation has not yet been added to the default content list panel or the user interface element displays a second icon indicative that the article representation has been added to the default content list panel.

19. A computer program product comprising a non-transitory computer-readable storage medium storing executable code for managing a content list panel, the code when executed performs steps comprising:

displaying, on a device, a web browser application comprising a main window displaying an article and a user interface element associated with a plurality of content lists that include a first content list and a second content list, wherein the individual user interface element is user selectable to automatically add the article to either the first content list or the second content list;

receiving a selection of the user interface element to add an article representation of the article displayed in the main window to either the first content list or the second content list from the plurality of content lists;

determining whether to add the article representation of the article to the first content list or the second content list based on whether the selection of the individual user interface element is less than a threshold amount of time or greater than the threshold amount of time;

adding the article representation to the first content list from the plurality of distinct content lists responsive to the selection of the individual user interface element being less than the threshold amount of time;

adding the article representation to the second content list from the plurality of distinct content lists responsive to the selection of the individual user interface element being greater than the threshold amount of time, wherein the article representation is added to the content list panel without displaying a modal dialog box to add the article representation to the content list pane;

receiving a request to display a bookmarks drop down menu of the web browser application, the bookmarks drop down menu including an article menu item corresponding to the added article representation;

displaying the bookmarks drop down menu of the web browser application;

receiving a request to revise the article menu item included in the bookmarks drop down menu;

receiving a revision to the article menu item directly in the bookmarks drop down menu without displaying a modal dialog box to revise the article menu item; and displaying the revised article menu item in the bookmarks drop down menu based on the revision.

20. The computer program product of claim 19, wherein the code when executed performs further steps comprising:
updating the article representation in the content list panel based on the revision to the article menu item in the bookmarks drop down menu.

* * * * *